(12) United States Patent
Maruoka et al.

(10) Patent No.: US 10,353,396 B2
(45) Date of Patent: Jul. 16, 2019

(54) VEHICLE PERIPHERY MONITORING DEVICE

(71) Applicant: AISIN SEIKI KABUSHIKI KAISHA, Kariya-shi, Aichi-ken (JP)

(72) Inventors: Tetsuya Maruoka, Okazaki (JP); Kazuya Watanabe, Anjo (JP); Junya Kasugai, Kagamihara (JP); Yoji Inui, Ama-gun (JP); Masahiko Sakabe, Kariya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 15/611,915

(22) Filed: Jun. 2, 2017

(65) Prior Publication Data

US 2018/0004222 A1    Jan. 4, 2018

(30) Foreign Application Priority Data

Jun. 30, 2016   (JP) ................................ 2016-129637

(51) Int. Cl.
| | | |
|---|---|---|
| *B62D 6/00* | (2006.01) | |
| *G05D 1/02* | (2006.01) | |
| *B60R 1/00* | (2006.01) | |
| *G06K 9/00* | (2006.01) | |
| *B62D 15/02* | (2006.01) | |

(52) U.S. Cl.
CPC ............. *G05D 1/0246* (2013.01); *B60R 1/00* (2013.01); *B62D 6/002* (2013.01); *B62D 15/025* (2013.01); *B62D 15/0275* (2013.01); *B62D 15/0285* (2013.01); *G05D 1/0212* (2013.01); *G06K 9/00791* (2013.01); *B60R 2300/305* (2013.01); *B60R 2300/802* (2013.01); *B60R 2300/8086* (2013.01)

(58) Field of Classification Search
CPC ......... G05D 1/0246; B60R 1/00; B62D 6/002
See application file for complete search history.

(56) References Cited

U.S. PATENT DOCUMENTS

| | | | |
|---|---|---|---|
| 2006/0287826 A1* | 12/2006 | Shimizu ................. | B60K 35/00 701/431 |
| 2014/0343802 A1* | 11/2014 | Pichlmaier ........... | A01B 63/112 701/50 |
| 2015/0203035 A1* | 7/2015 | Watanabe .......... | B62D 15/0295 382/103 |
| 2016/0009225 A1 | 1/2016 | Watanabe et al. | |
| 2016/0152264 A1* | 6/2016 | Watanabe .......... | B62D 15/0295 701/41 |

(Continued)

FOREIGN PATENT DOCUMENTS

| | | |
|---|---|---|
| JP | 2014-067299 A | 4/2014 |
| JP | 2016-021653 A | 2/2016 |

*Primary Examiner* — Jess Whittington
(74) *Attorney, Agent, or Firm* — Sughrue Mion, PLLC

(57) ABSTRACT

A vehicle periphery monitoring device includes: a peripheral image acquisition unit that acquires a peripheral image output from an imaging unit that images a periphery of a vehicle; an idling determination unit that determines whether a wheel is idling based on a physical quantity of the wheel of the vehicle; and a display controller that displays the peripheral image on a display, and changes a display form of a predicted course of the wheel on the peripheral image according to an idling state of the wheel.

7 Claims, 9 Drawing Sheets

(56) References Cited

U.S. PATENT DOCUMENTS

2016/0379389 A1* 12/2016 Fukada ................. B60K 35/00
                                                      345/589
2017/0261326 A1*  9/2017 Mizutani ............... B60W 30/06

* cited by examiner

VEHICLE PERIPHERY MONITORING DEVICE

CROSS REFERENCE TO RELATED APPLICATIONS

This application is based on and claims priority under 35 U.S.C. § 119 to Japanese Patent Application 2016-129637, filed on Jun. 30, 2016, the entire contents of which are incorporated herein by reference.

TECHNICAL FIELD

This disclosure relates to a vehicle periphery monitoring device.

BACKGROUND DISCUSSION

In the related art, there has been suggested, as a vehicle driving assistance technology, a technology of assisting driving by imaging the periphery of a vehicle through an imaging device, such as a camera, mounted in the vehicle, and displaying captured image data as an imaging result.

The wheels of a vehicle may idle (slip) depending on the condition of a road surface such as a sandy or rocky road. In order to cope with this, an example of a technology displays an idling wheel with lighting or the like on a vehicle icon of a screen. For example, when two left wheels (a left front wheel and a left rear wheel) among four wheels of the vehicle are idling, the two left wheels which are idling are displayed with lighting on a vehicle icon of a screen so that an occupant (a driver or the like) who has seen the displaying may recognize that the two left wheels are idling. See, for example, JP 2016-021653A (Reference 1).

However, in the above described technology of displaying idling wheels, since the idling wheels are displayed merely with lighting on a vehicle icon, it may be difficult for the occupant to grasp a current idling state of wheels.

SUMMARY

A vehicle periphery monitoring device according to an aspect of this disclosure includes, for example, a peripheral image acquisition unit that acquires a peripheral image output from an imaging unit that images a periphery of a vehicle; an idling determination unit that determines whether a wheel is idling based on a physical quantity of a wheel of the vehicle; and a display controller that displays the peripheral image on a display, and changes a display form of a predicted course of the wheel on the peripheral image according to an idling state of the wheel. According to this configuration, for example, the display form of the predicted course of the wheel on the peripheral image displayed on the display is changed according to the idling state of the wheel, and thus the occupant may easily grasp the current idling state of the wheel.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, descriptions will be made on an example of a vehicle periphery monitoring device according to an embodiment, which is mounted in a vehicle 1. In the embodiment, the vehicle 1 may be, for example, an automobile (an internal combustion engine automobile) using an internal combustion engine (an engine, not illustrated) as a drive source, or an automobile (an electric automobile, a fuel cell automobile, etc.) using an electric motor (a motor, not illustrated) as a drive source. Alternatively, the vehicle 1 may be an automobile (a hybrid automobile) using both of them as a drive source. The vehicle 1 may be mounted with various transmissions, or various devices (systems, parts, etc.) required for driving an internal combustion engine or an electric motor. Types, the number, a layout or the like of devices related to driving of a wheel 3 in the vehicle 1 may be variously set.

Figure 1:
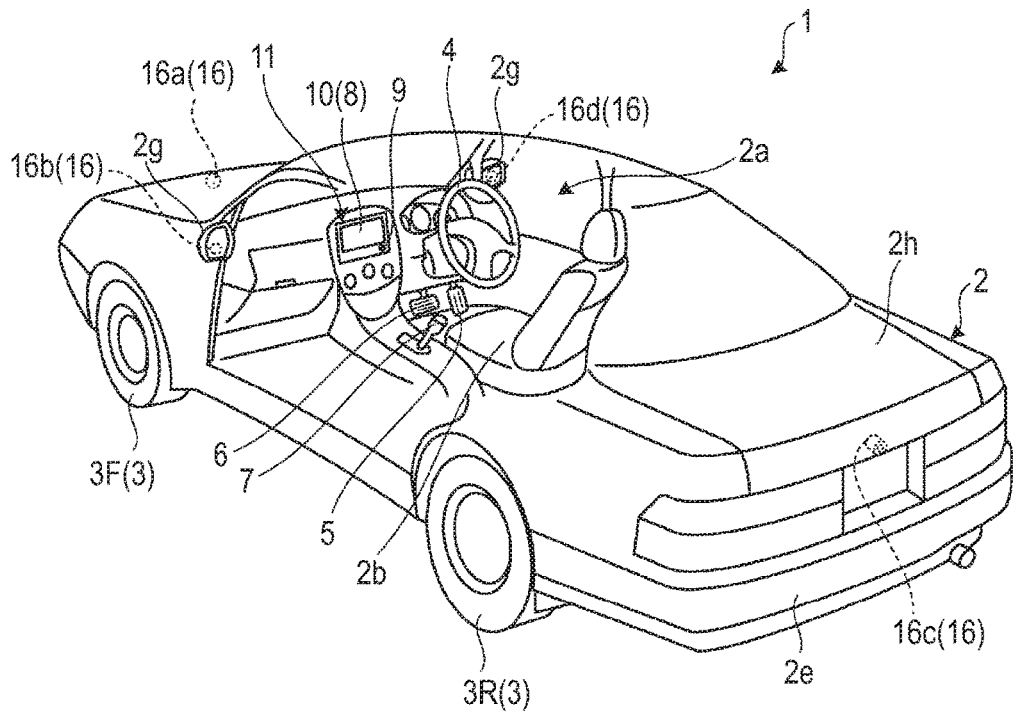
FIG. 1 is a perspective view illustrating an exemplary vehicle mounted with a vehicle periphery monitoring device according to an embodiment, in which a vehicle compartment is partially viewed.

FIG. 1 is a perspective view illustrating an example of the vehicle 1 mounted with a vehicle periphery monitoring device according to the embodiment, through which a part of a vehicle compartment 2a is seen. As illustrated in FIG. 1, a vehicle body 2 according to the embodiment includes the vehicle compartment 2a in which an occupant (not illustrated) gets. Within the vehicle compartment 2a, a steering unit 4, an accelerating unit 5, a braking unit 6, a gear shift operating unit 7, and the like are provided in a state of facing a seat 2b of a driver as an occupant. In the embodiment, for example, the steering unit 4 is a handle protruding from a dashboard (instrument panel). The accelerating unit 5 is an accelerator pedal disposed under the feet of the driver. The braking unit 6 is a brake pedal disposed under the feet of the driver. The gear shift operating unit 7 is a shift lever protruding from a center console. However, the disclosure is not limited thereto.

A display device 8 and an audio output device 9 are provided within the vehicle compartment 2a. The display device 8 is, for example, a liquid crystal display (LCD), an organic electro-luminescent display (OELD), or the like. The audio output device 9 is, for example, a speaker. In the embodiment, for example, the display device 8 is covered with a transparent operation input unit 10 (e.g., a touch panel). The occupant or the like may visually recognize a video (image) displayed on a display screen of the display device 8 through the operation input unit 10. The occupant or the like may perform an operation of touching, pressing, or moving the operation input unit 10 with a finger or the like at a position corresponding to the video (image) displayed on the display screen of the display device 8 so as to execute operation input (instruction input). In the embodiment, for example, the display device 8, the audio output device 9, the operation input unit 10, and the like are provided in a monitor device 11 disposed at the center portion in the vehicle width direction (left-right direction) of a dashboard. The monitor device 11 may include an operation input unit (not illustrated) such as a switch, a dial, a joystick, or a push button. A separate audio output device (not illustrated) may be provided at a position different from the position of the monitor device 11, within the vehicle compartment 2a. A sound may be output from both the audio output device 9 of the monitor device 11 and the separate audio output device. In the embodiment, for example, the monitor device 11 is also used as a navigation system or an audio system, whereas another monitor device for a vehicle periphery monitoring device may be provided separately from the systems.

Figure 2:
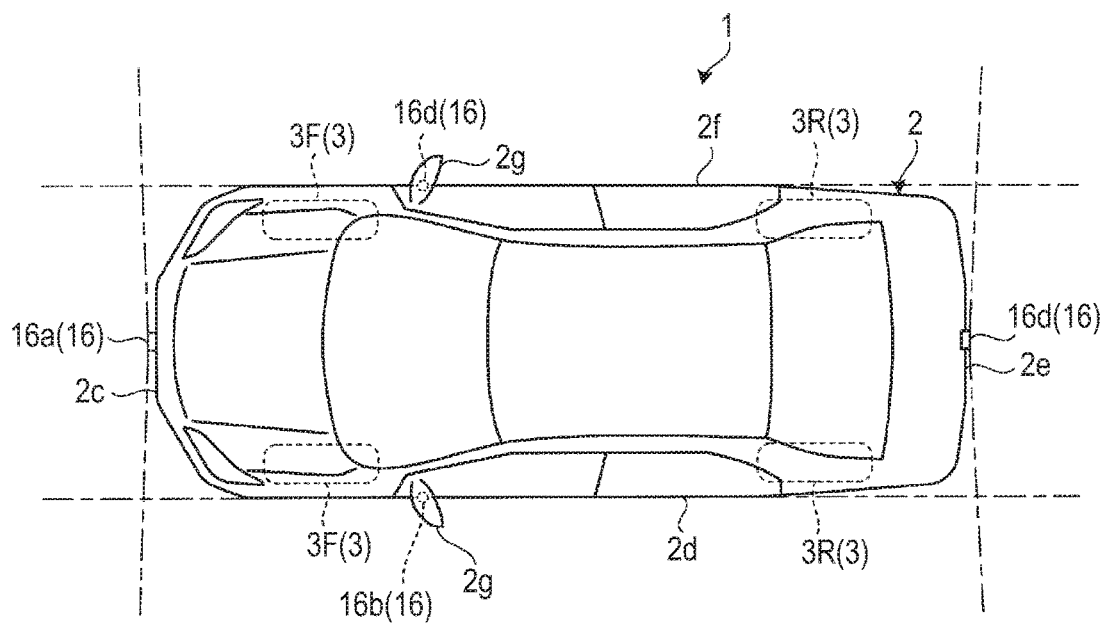
FIG. 2 is a plan view (overhead view) illustrating the exemplary vehicle mounted with the vehicle periphery monitoring device according to the embodiment.

Here, FIG. 2 is a plan view (overhead view) illustrating an example of the vehicle 1 mounted with the vehicle periphery monitoring device according to the embodiment. As illustrated in FIGS. 1 and 2, in the embodiment, for example, the vehicle 1 is a four-wheeled vehicle (four-wheeled automobile), and includes two left/right front wheels 3F (hereinafter, the reference numeral "3F" may be omitted), and two left/right rear wheels 3R (hereinafter, the reference numeral "3R" may be omitted). For example, the tire angles of the front wheels 3F are changed (steered) according to the operation of the steering unit 4 (handle).

Figure 3:
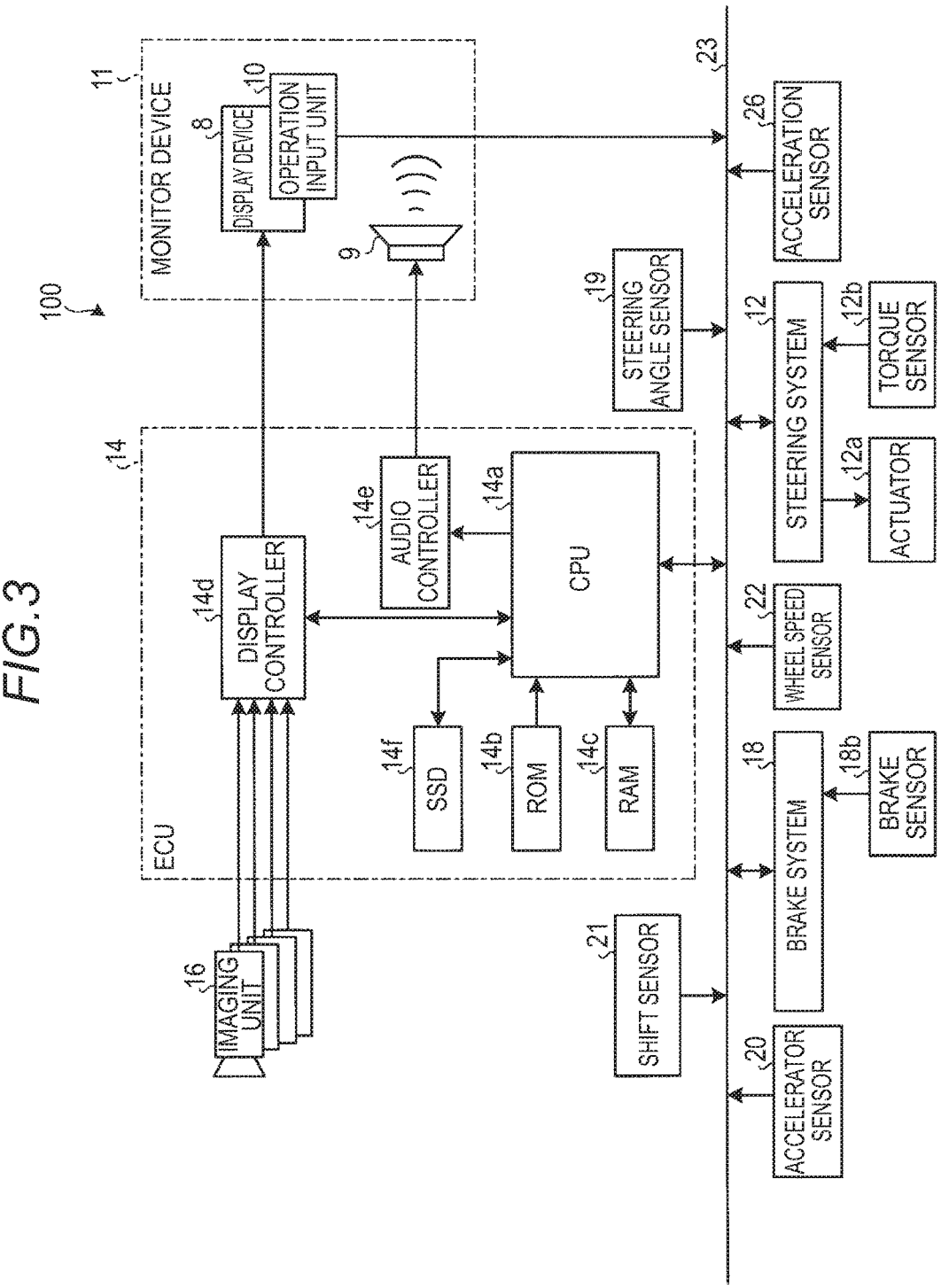
FIG. 3 is a block diagram illustrating an example of the vehicle periphery monitoring device according to the embodiment.

Here, FIG. 3 is a block diagram illustrating an example of the vehicle periphery monitoring device according to the embodiment. A steering system 12 is, for example, an electric power steering system, a steer by wire (SBW) system or the like. The steering system 12 steers the front wheels 3F by applying a torque (assist torque) to the steering unit 4 and supplementing a steering force by an actuator 12a.

The steering system 12 (steering controller) may be configured to automatically perform steering when, for example, the wheels 3 are idling.

In the embodiment, the idling of a wheel 3 may include not only a state where the wheel 3 idles, but also a state where the wheel 3 is losing a driving force due to action of a differential gear or the like because another wheel 3 idles. The idling of the wheel 3 may include not only complete idling, but also idling with an idling rate (slip rate) equal to or larger than a predetermined value.

In the embodiment, for example, as illustrated in FIG. 2, plural imaging units 16 (16a to 16d) (for example, four imaging units in the embodiment) are provided in the vehicle 1 (the vehicle body 2). The imaging units 16 are, for example, digital cameras incorporating an imaging element such as, a charge coupled device (CCD) or a CMOS image sensor (CIS). The imaging units 16 may output captured image data (moving image data or frame data) at a predetermined frame rate. Each of the imaging units 16 includes a wide angle lens, and may capture an image in, for example, a range (viewing angle) from 140° to 220° in the horizontal direction. The imaging unit 16 is provided facing a direction in which a surrounding environment including a road surface may be imaged.

In the embodiment, for example, the imaging unit 16a is disposed on an end portion 2c at the front side of the vehicle body 2 (an end portion in the plan view), and provided on a front grille or the like. The imaging unit 16b is disposed on an end portion 2d at the left side of the vehicle body 2, and installed on a left door mirror 2g. The imaging unit 16c is disposed on an end portion 2e at the rear side of the vehicle body 2, and installed on a lower wall portion of a door 2h of a rear trunk. The imaging unit 16d is disposed at an end portion 2f at the right side of the vehicle body 2, and installed on a right door mirror 2g. A method of mounting the imaging units 16 in the vehicle is not limited by the embodiment, as long as the imaging units 16 are provided in the vehicle 1 so as to acquire captured image data in the front direction, the left and right side directions, and the rear direction.

As illustrated in FIG. 3, an electronic control unit (ECU) 14 executes an arithmetic processing or an imaging processing based on captured image data obtained by the plural imaging units 16, and displays the captured image data for which the imaging processing has been performed on the display device 8.

In a periphery monitoring system (vehicle periphery monitoring device) 100, the ECU 14, the monitor device 11 and the like are electrically connected to a brake system 18, a steering angle sensor 19, an accelerator sensor 20, a shift sensor 21, a wheel speed sensor 22, an acceleration sensor 26, and the like via an in-vehicle network 23 (electric communication line). The in-vehicle network 23 is configured as, for example, a controller area network (CAN). The ECU 14 may control the brake system 18, the steering system 12, and the like by sending control signals through the in-vehicle network 23. The ECU 14 may receive detection results from a torque sensor 12b, a brake sensor 18b, the steering angle sensor 19, the accelerator sensor 20, the shift sensor 21, the wheel speed sensor 22, the acceleration sensor 26, and the like through the in-vehicle network 23. The ECU 14 may receive instruction signals of the operation input unit 10 or the like (control signals, operation signals, input signals, and data).

The ECU 14 includes, for example, a central processing unit (CPU) 14a, a read only memory (ROM) 14b, a random access memory (RAM) 14c, a display controller 14d, an audio controller 14e, a solid state drive (SSD, flash memory) 14f, and the like. The CPU 14a executes, for example, an imaging processing related to an image displayed by the display device 8, and various arithmetic processings such as calculation of a movement path of the vehicle 1, and determination of presence or absence of interference with an object. The CPU 14a reads a program stored in a non-volatile memory device such as the ROM 14b and executes the arithmetic processing according to the program.

The RAM 14c temporarily stores various data used for calculation in the CPU 14a. The display controller 14d mainly executes an imaging processing using captured image data obtained by the imaging unit 16, an imaging processing (e.g., synthesis or the like) of captured image data displayed by the display device 8, or the like during the arithmetic processing in the ECU 14. The audio controller 14e mainly executes a processing of audio data output by the audio output device 9 during the arithmetic processing in the ECU 14. The SSD 14f is a rewritable non-volatile memory unit, and may store data even when the ECU 14 is powered OFF. The CPU 14a, the ROM 14b, the RAM 14c, and the like may be integrated in the same package. The ECU 14 may be implemented by another logic operation processor such as a digital signal processor (DSP), a logic circuit or the like, instead of the CPU 14a. Instead of the SSD 14f, the hard disk drive (HDD) may be provided, and the SSD 14f and the HDD may be provided separately from the ECU 14.

Figure 4:
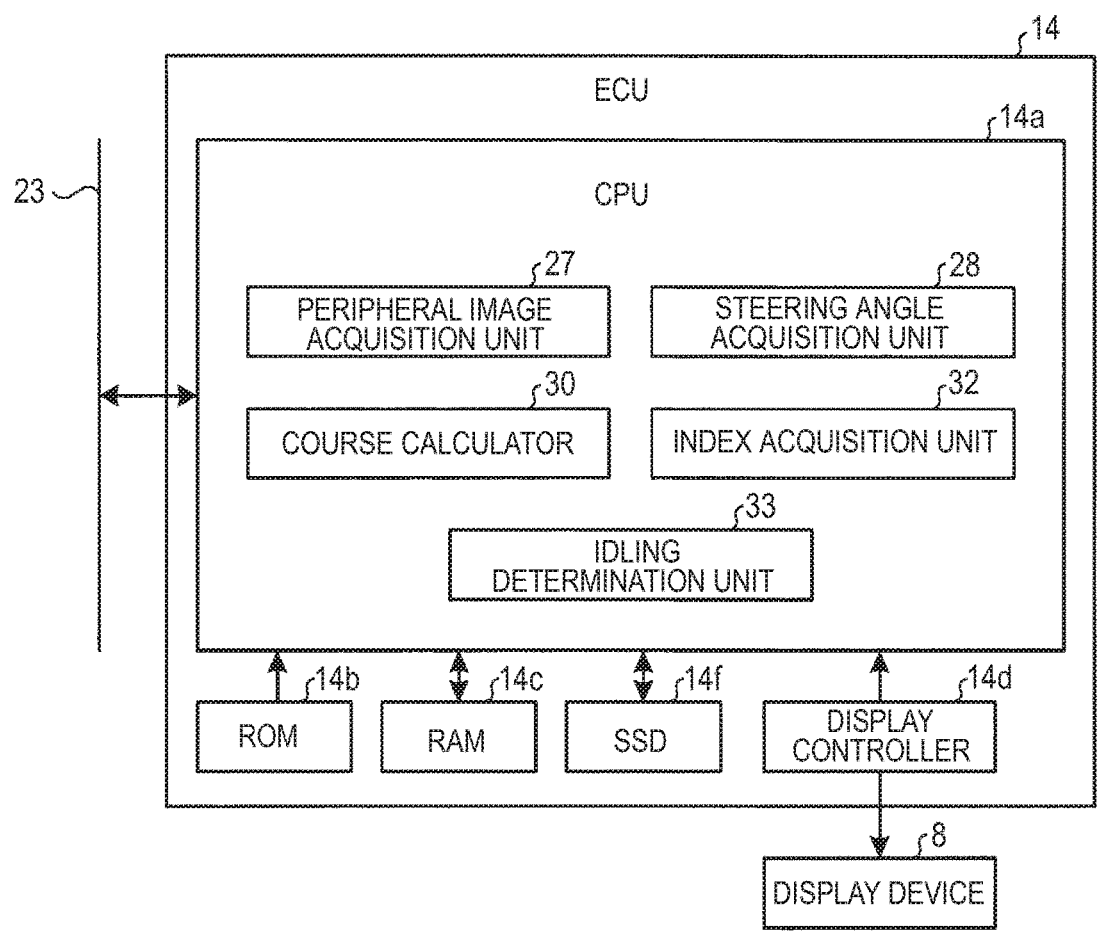
FIG. 4 is a block diagram illustrating each configuration implemented within an ECU of the vehicle periphery monitoring device according to the embodiment.

Here, FIG. 4 is a block diagram illustrating each configuration implemented within the ECU 14 of the vehicle periphery monitoring device according to the embodiment. As illustrated in FIG. 4, the CPU 14a includes various modules implemented when a program installed and stored in a memory device such as the ROM 14b is read and executed. The CPU 14a includes, as modules related to display control in the embodiment, for example, a peripheral image acquisition unit 27, a steering angle acquisition unit 28, a course calculator 30, an index acquisition unit 32, an idling determination unit 33 and the like.

The peripheral image acquisition unit 27 acquires captured image data (peripheral images) output from the imaging units 16. The steering angle acquisition unit 28 acquires a detection result (a steering angle of the vehicle 1) of the steering angle sensor 19, which is supplied through the in-vehicle network 23. The course calculator 30 calculates a predicted course of each of the vehicles 3 of the vehicle 1 based on the steering angle provided from the steering angle acquisition unit 28.

The index acquisition unit 32 reads indices indicating outer shape information of the vehicle 1 stored in the memory device such as the SSD 14f based on the steering angle provided from the steering angle acquisition unit 28. The indices indicating the outer shape information of the vehicle 1 may be, for example, information indicating a vehicle width of the vehicle 1, information indicating ground contact positions of the wheels 3, information indicating a distance in front of the vehicle or the like. Specific explanation of indices will be described later.

The idling determination unit 33 determines whether each wheel 3 is idling based on a physical quantity related to each wheel 3 at predetermined time intervals. When the wheel 3 is idling, a deviation occurs between a target value and an actual value in relation to a physical quantity such as a number of revolutions, a torque, a current, or the like of the wheel 3 (or the electric motor) based on a torque command of the ECU 14. For example, the idling determination unit 33 may determine whether the wheel 3 is idling based on the deviation between the values. The idling determination unit 33 may determine the idling by comparing the respective wheels 3 to each other in the rotational speed or the number of revolutions.

The display controller 14d displays a peripheral image on a display (the display device 8, etc.) and changes a display form of a predicted course of the wheel 3 on the peripheral image according to an idling state of the wheel 3. For example, as the degree of idling of the wheel 3 increases, the display controller 14d performs a display control by, for example, increasing the transparency of a predicted course that is displayed to be superimposed on the peripheral image (removing the predicted course when the wheel is completely idling), changing a solid line into a dashed line, changing a color, and changing a shadow line (details will be described below).

The display controller 14d may change a display form of a predicted course based on a steering angle for each of front and rear wheels, according to an idling state (details will be described below).

The peripheral image may include a side image indicating a side of the vehicle 1. In a case where a steering angle equals to or larger than a predetermined value, the display controller 14d may superimpose and display a predicted course on the side image based on the steering angle for each of front and rear wheels when the wheel 3 is not idling, and may not superimpose and display the predicted course on the side image when the wheel 3 is idling (details will be described below).

Respective modules implemented in the CPU 14a may be individually configured for respective functions, as described above, and plural functions may be integrated and implemented as one module. Conversely, functions may be implemented by being further subdivided.

Figure 5:
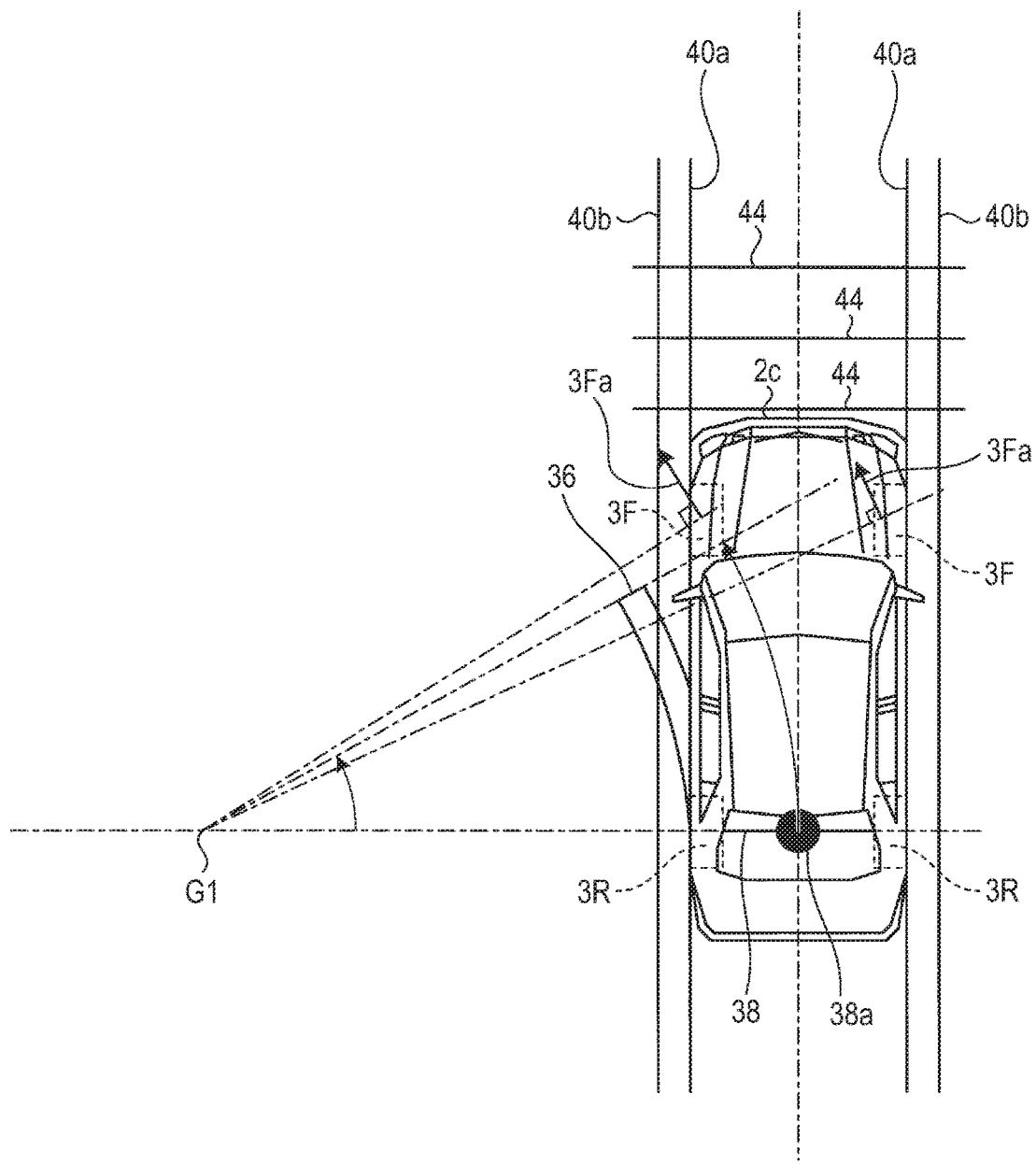
FIG. 5 is an explanatory view illustrating a calculation example in a case where a rear wheel width trajectory is calculated in the vehicle periphery monitoring device according to the embodiment.

Hereinafter, descriptions will be made on an example of a calculation procedure of a rear wheel width trajectory (predicted course) with reference to FIG. 5. FIG. 5 is an explanatory view illustrating a calculation example in a case where a rear wheel width trajectory is calculated in the vehicle periphery monitoring device according to the embodiment. When the driver changes a steering angle of front wheels 3F by operating the steering unit (handle) 4, a point where a direction orthogonal to a direction 3Fa of the front wheels 3F intersects with an extension direction of a rear wheel axle 38 supporting rear wheels 3R becomes a turning center G1 of the vehicle 1. That is, when the vehicle 1 turns according to the steering angle of the front wheels 3F, a center point 38a of the rear wheel axle 38 moves along an arc centered on the turning center G1. The rear wheels 3R also move along an arc centered on the turning center G1. According to this principle, the course calculator 30 may calculate a rear wheel width trajectory 36 of the rear wheels 3R based on the steering angle of the front wheels 3F.

The course calculator 30 may also calculate a front wheel width trajectory (predicted course) of the front wheels 3F of the vehicle 1. The display controller 14d may superimpose and display the front wheel width trajectory on captured front image data output from the imaging unit 16a that images a front image of the vehicle 1. The front wheel width trajectory may be displayed as an index indicating a direction where the front wheels 3F face, based on, for example, the steering angle provided from the steering angle acquisition unit 28. The displayed length of the front wheel width trajectory may be a predetermined value such as a length corresponding to, for example, 5 m on the front image on which the front wheel width trajectory superimposes, or may be properly set by a user through the operation input unit 10.

When the rear wheels 3R are not steered, the direction of the rear wheels 3R always face the vehicle front-rear direction. Thus, in a case where the front wheels 3F are steered and the vehicle 1 is turned, when the steering angle of the front wheels 3F is small, the inwardly protruding amount of the rear wheel width trajectory 36 during the turning is small and thus substantially overlaps the side portion of the vehicle 1 and becomes hardly recognized. The rear wheel width trajectory 36 slightly protruding from the side portion of the vehicle 1 may give the user troublesomeness that it becomes difficult to distinguish the rear wheel width trajectory 36 from the side portion contour of the vehicle 1. Therefore, for example, the display controller 14d may superimpose and display the rear wheel width trajectory 36 on captured side image data provided from the imaging unit 16b (the imaging unit 16d) of the vehicle 1 only when the steering angle of the vehicle 1 provided from the rear wheel axle 38 becomes equal to or larger than a predetermined value. That is, the display controller 14d may display the rear wheel width trajectory 36 when the steering angle of the front wheels 3F increases to some extent, and the necessity of display of the predicted course of the rear wheels 3R increases. A predetermined value of the steering angle at which the display of the rear wheel width trajectory 36 is initiated may be set as, for example, 270°. In this case, since the rear wheel width trajectory 36 is displayed sufficiently away from the side portion contour of the vehicle 1, it becomes easy to grasp the predicted course of the rear wheels 3R. It is possible to suppress troublesomeness that it becomes difficult to distinguish the rear wheel width trajectory 36 from the side portion contour of the vehicle 1 from being given to the user.

When the steering angle is smaller than 270°, it is considered that the rear wheels 3R pass through substantially the same course as the front wheels 3F. As described above, the display controller 14d may superimpose and display the front wheel width trajectory of the front wheels 3F on the front image. Accordingly, the user may estimate the predicted course of the rear wheels 3R by checking the front wheel width trajectory even when the steering angle is smaller than a predetermined value, and thus the rear wheel width trajectory 36 is not displayed. The course calculator 30 does not have to calculate the rear wheel width trajectory 36 when the steering angle is smaller than the predetermined value, but may calculate the rear wheel width trajectory 36 even when the steering angle is smaller than the predetermined value. In a case where the calculation of the rear wheel width trajectory 36 is not performed at a steering angle smaller than the predetermined value, the processing load of the CPU 14a may be reduced. Conversely, in a case where the calculation is always made, when the steering angle becomes equal to or larger than the predetermined value, the superimposition/display may be quickly executed. The steering angle of 270° at which the display of the rear wheel width trajectory 36 is initiated is exemplary only, and the steering angle may be properly set and changed by the user through the operation input unit 10 or the like.

When the rear wheel width trajectory 36 is not displayed at a steering angle smaller than the predetermined value, the display controller 14d may superimpose and display an index indicating the outer shape information of the vehicle 1 on the captured side image data imaged by the imaging unit 16b (the imaging unit 16d). The index indicating the outer shape information of the vehicle 1 may include, as described above, for example, information indicating a vehicle width of the vehicle 1, information indicating ground contact positions of the wheels 3, information indicating a distance in front of the vehicle and the like. The information indicating the vehicle width of the vehicle 1 includes, for example, a vehicle width line 40a indicating a vehicle width, an offset vehicle-width line 40b shifted from the vehicle width line 40a by, for example, 0.35 m in the outward direction of the vehicle width and the like. When the vehicle width line 40a, the offset vehicle-width line 40b or the like is displayed, the user may easily grasp the relationship between the vehicle 1 and the surroundings, for example, the presence or absence of contact, or the adequacy of the spacing. A ground contact line 42 (see, FIG. 6) indicating a ground contact position of the wheel 3 is displayed on, for example, the offset vehicle-width line 40b so that the vehicle width of the vehicle 1 and the ground contact position of the wheel 3 may be easily associated with each other. For example, plural distance lines 44 indicating a distance in front of the vehicle are displayed at predetermined intervals from the end portion 2c at the front side of the vehicle 1. This makes it easy to understand the sense of the forward distance of the vehicle 1. A part of the distance lines 44 may be displayed on a side screen. These indices are lines fixed with respect to the vehicle 1. Thus, even when the lines are always displayed, the lines hardly give an annoying or uncomfortable feeling to the user.

The indices such as the vehicle width lines 40a, the offset vehicle-width lines 40b, the ground contact lines 42, and the distance lines 44 may be displayed instead of the rear wheel width trajectory 36 when the rear wheel width trajectory 36 is not displayed, that is, when the steering angle is smaller than the predetermined value. Also, the indices may be displayed together with the rear wheel axle 38 even after the rear wheel width trajectory 36 is displayed at the steering angle equal to or larger than the predetermined value. When any one of the index and the rear wheel width trajectory 36 is selectively displayed, each display may be highlighted and thus may be easily recognized by the user. Meanwhile, when the index is displayed even after the rear wheel width trajectory 36 is displayed, there is an effect that the relationship between the predicted course of the rear wheels 3R and the outer shape of the vehicle 1 is easily understood.

Figure 6:
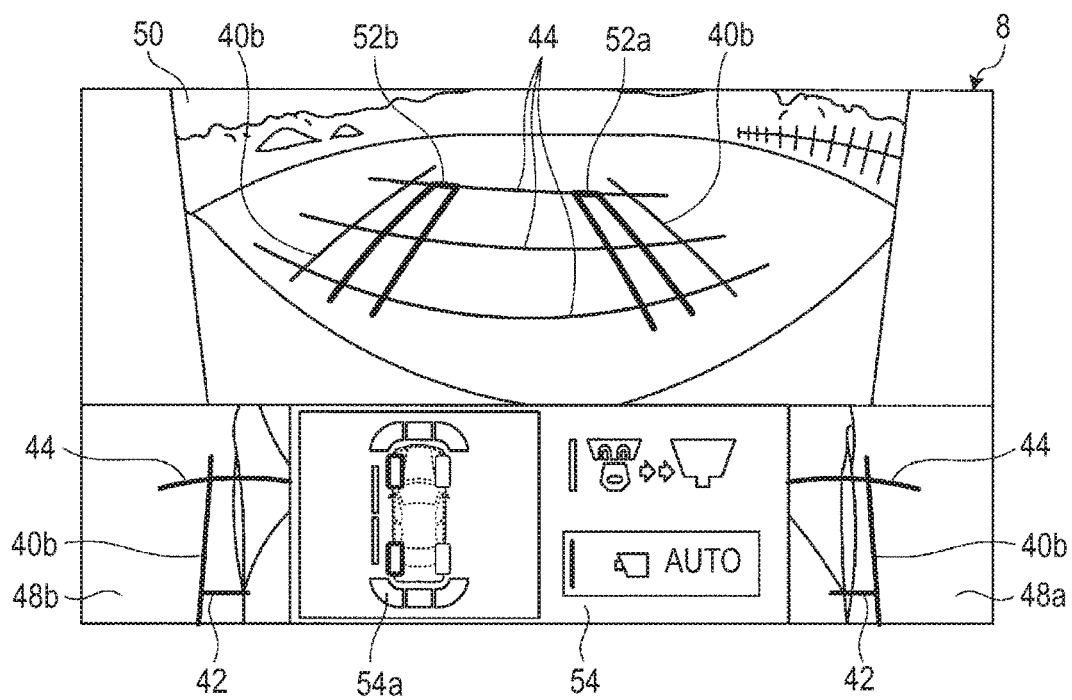
FIG. 6 is a view illustrating a display example of a driving assistant image in the comparative example (the related art)

Hereinafter, descriptions will be made on a display example of a driving assistant image in a comparative example (a prior art) in order to facilitate the understanding of a display example of a driving assistant image according to the embodiment. FIG. 6 is a view illustrating a display example of a driving assistant image in the comparative example. FIG. 6 corresponds to a display example when a steering angle is smaller than a predetermined value. In FIG. 6, the rear wheel width trajectory 36 is not displayed, and indices indicating the outer shape information of the vehicle 1, such as the offset vehicle-width lines 40b, the ground contact lines 42, the distance lines 44 and the like, are displayed to be superimposed in a right side image area 48a and a left side image area 48b. In a front image area 50, the offset vehicle-width lines 40b or the distance lines 44 are displayed to be superimposed, together with front wheel width trajectories 52a and 52b.

A vehicle icon display area 54 displaying a vehicle icon 54a or the like which indicates an idling state, etc. of each wheel 3 of the vehicle 1 is allocated to the central lower portion interposed between the right side image area 48a and the left side image area 48b. When there is the idling wheel 3, a portion on the vehicle icon 54a corresponding to the wheel 3 is lighted. In the example of FIG. 6, two left wheels are lighted on the vehicle icon 54a. However, since the idling wheel portions are merely lighted on the vehicle icon 54a while displayed, it may be difficult for the occupant to grasp a current idling state of the wheels (to recognize the corresponding lighted display).

Figure 7:
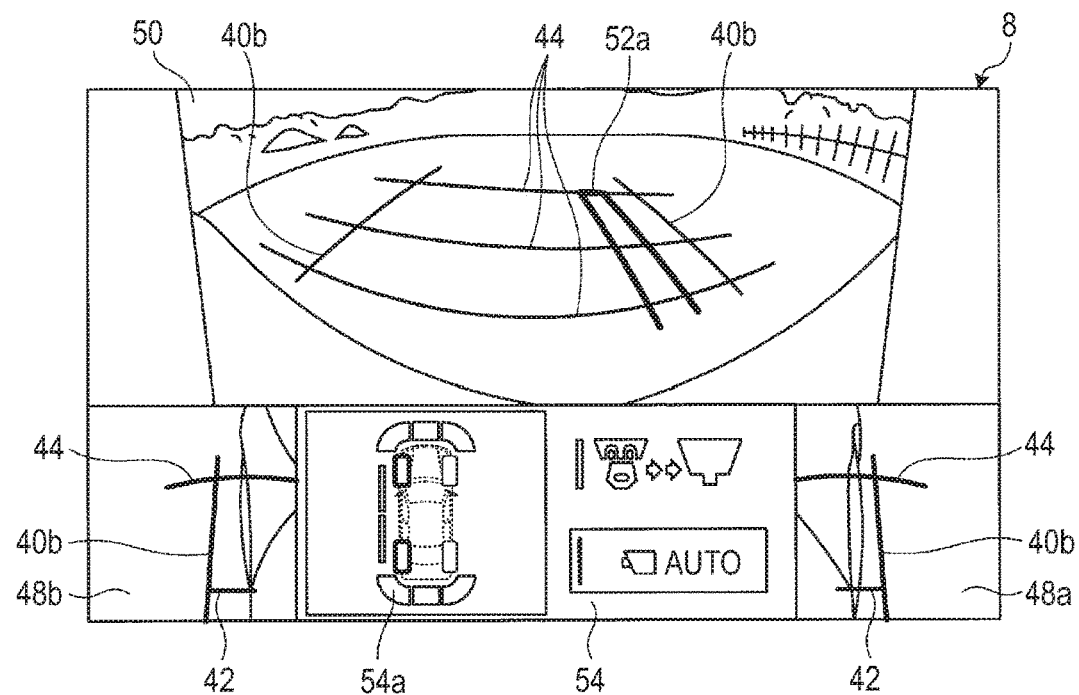
FIG. 7 is a view illustrating a display example of a driving assistant image in the vehicle periphery monitoring device according to the embodiment, in which a predicted course corresponding to an idling wheel is not displayed.

Hereinafter, descriptions will be made on a display example of a driving assistant image in the embodiment. FIG. 7 is a view illustrating a display example of a driving assistant image in the vehicle periphery monitoring device according to the embodiment, in which a predicted course corresponding to the idling wheel 3 is not displayed. Descriptions on the same points as those in FIG. 6 will be omitted as appropriate (the same applies to FIGS. 8 to 11).

In the display example of FIG. 7, since the left front wheel of the vehicle 1 is idling, the front wheel width trajectory 52b is not displayed. Since the front wheel width trajectory 52b has been displayed at the stage where the left front wheel is not idling, the occupant may certainly grasp the idling of the left front wheel through the non-display of the front wheel width trajectory 52b.

Figure 8:
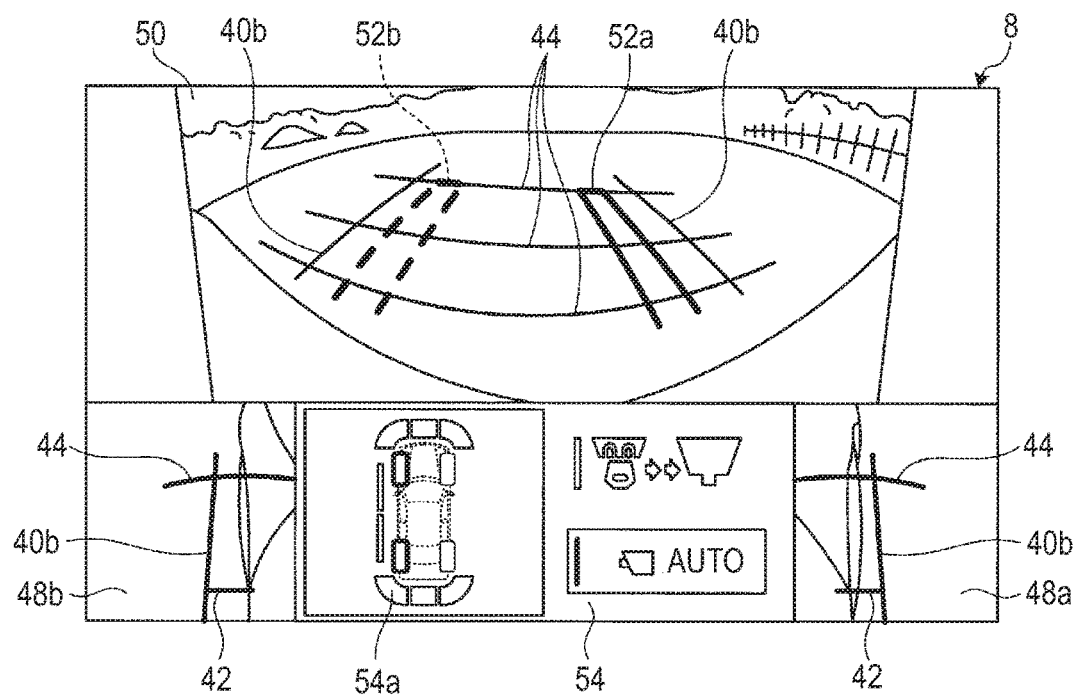
FIG. 8 is a view illustrating a display example of a driving assistant image in the vehicle periphery monitoring device according to the embodiment, in which a predicted course corresponding to the idling wheel is indicated by a dashed line.

Hereinafter, descriptions will be made on another display example of a driving assistant image in the embodiment, in which a predicted course corresponding to the idling wheel 3 is indicated by dashed lines instead of non-display. FIG. 8 is a view illustrating a display example of a driving assistant image in the vehicle periphery monitoring device according to the embodiment, in which a predicted course corresponding to the idling wheel 3 is indicated by dashed lines.

In the display example of FIG. 8, since the left front wheel of the vehicle 1 is idling, the front wheel width trajectory 52b is indicated by dashed lines. The display of the front wheel width trajectory 52b by dashed lines allows the occupant to certainly grasp the idling of the left front wheel, and to recognize the predicted course of the left front wheel when the idling of the left front wheel is resolved.

Figure 9:
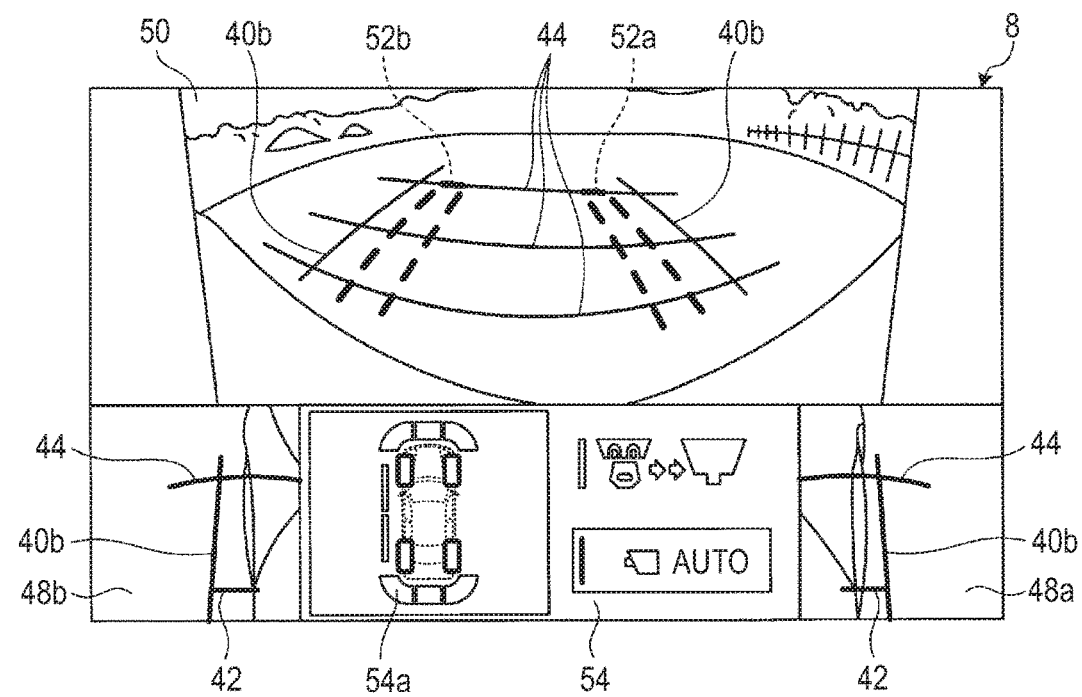
FIG. 9 is a view illustrating a display example of a driving assistant image in the vehicle periphery monitoring device according to the embodiment, in which predicted courses respectively corresponding to the two idling front wheels are indicated by a dashed line.

Hereinafter, descriptions will be made on another display example of a driving assistant image in the embodiment, in which the vehicle 1 is stacked. Here, the term "staked" indicates that all the four wheels of the vehicle 1 lose grip (or a driving force) and the vehicle 1 does not move. The stack of the vehicle 1 may easily occur in, for example, sandy roads, rocky roads, frozen roads, or the like. FIG. 9 is a view illustrating a display example of a driving assistant image in the vehicle periphery monitoring device in the embodiment, in which predicted courses respectively corresponding to the two idling front wheels are indicated by dashed lines.

In the display example of FIG. 9, since both of the two front wheels of the vehicle 1 are idling, the front wheel width trajectories 52a and 52b are indicated by dashed lines. Here, when seeing the display of the front wheel width trajectories 52a and 52b in dashed lines, the occupant may certainly grasp the idling of the two front wheels. Instead of the dashed-line display, non-display or color change may be applied.

Figure 10:
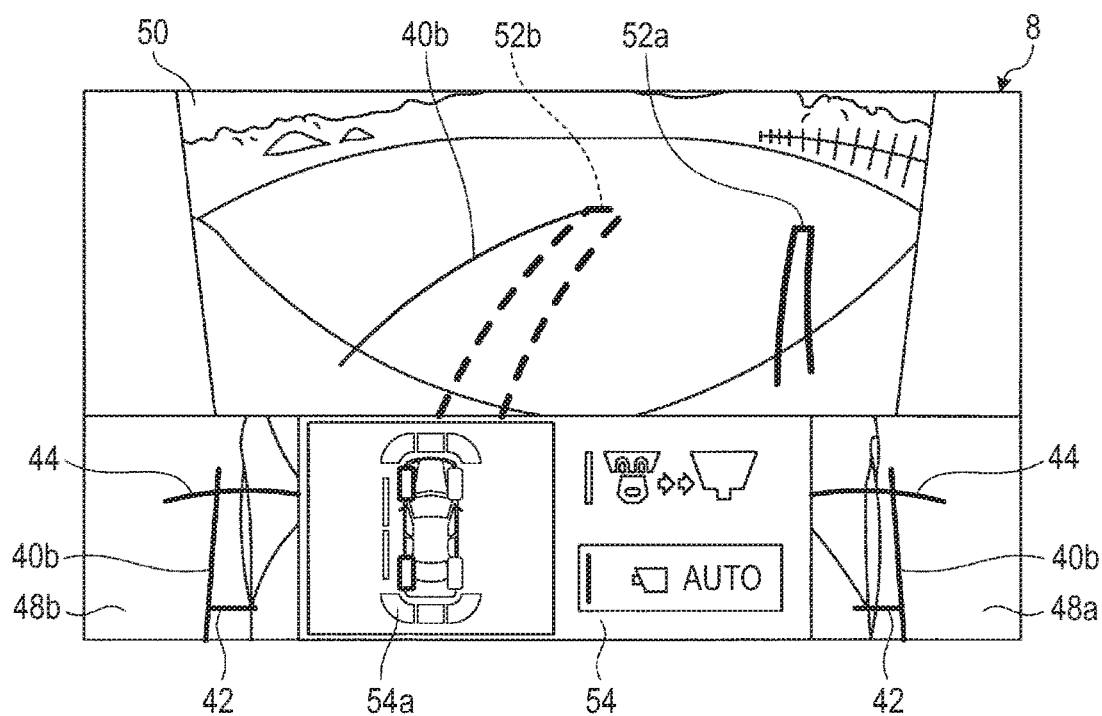
FIG. 10 is a view illustrating a display example of a driving assistant image in the vehicle periphery monitoring device according to the embodiment, in which the driver steers a steering unit to the right, and a predicted course corresponding to a right front wheel is indicated by a solid line.

Hereinafter, descriptions will be made on a display example when the driver has operated the steering unit 4 (handle) in order to resolve the stack state of the vehicle 1 (the case of the display example of FIG. 9). FIG. 10 is a view illustrating a display example of a driving assistant image in the vehicle periphery monitoring device according to the embodiment, in which the driver steers the steering unit 4 to the right, and a predicted course corresponding to the right front wheel is indicated by solid lines.

In the display example of FIG. 10, since the right front wheel is placed in a non-idling state by the driver who has steered the steering unit 4 to the right, the front wheel width trajectory 52a is indicated by solid lines instead of dashed lines. Accordingly, the occupant may certainly grasp that the right front wheel is placed in a non-idling state. When the steering angle equals to or larger than a predetermined value, the display switching may be applied to a predicted course of a rear wheel on the side of the turning direction as in the display illustrated in FIG. 11.

Figure 11:
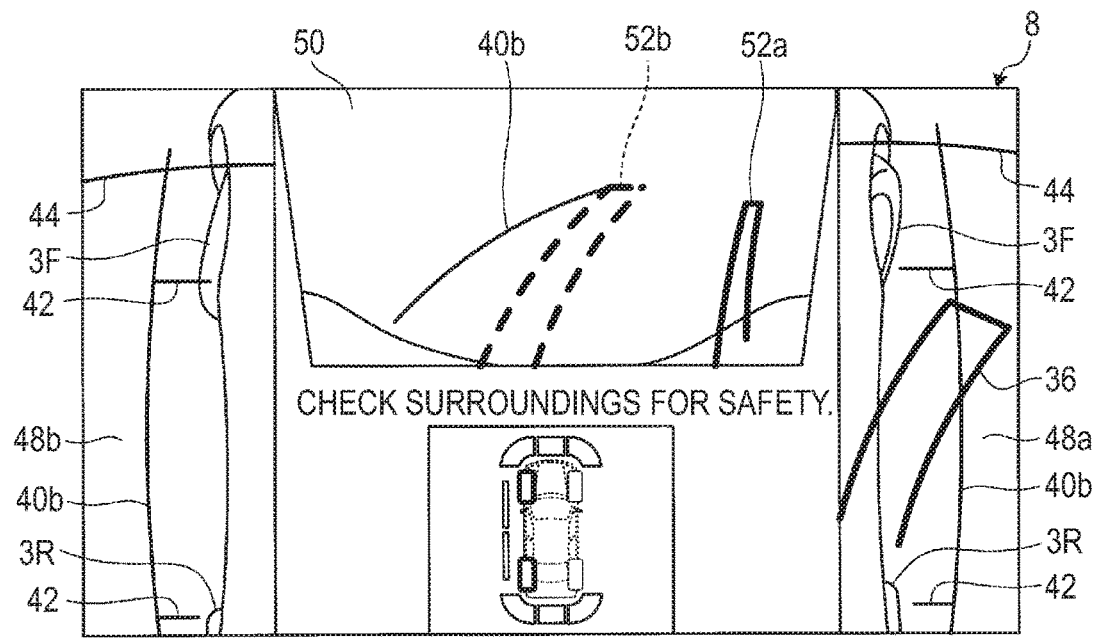
FIG. 11 is a view illustrating a display example in the vehicle periphery monitoring device according to the embodiment, in which a predicted course of a non-idling right rear wheel is indicated by a solid line on a side image.

FIG. 11 is a view illustrating a display example in the vehicle periphery monitoring device according to the embodiment, in which a predicted course of a non-idling right rear wheel is indicated by solid lines on the side image. In the display example of FIG. 11, the right side image area 48a is allocated to a display area of the display device 8 in a range from the right upper end to the lower end, and the left side image area 48b is allocated to the display area in a range from the left upper end to the lower end. This is for displaying the front wheels 3F and the rear wheels 3R (partially) on the right side image area 48a and the left side image area 48b. On the right side image area 48a, the rear wheel width trajectory 36 extending from the rear wheel 3R is superimposed and displayed. The rear wheel width trajectory 36 is a trajectory extending from the wheel, and thus may be easily recognized as a predicted course by the driver.

The front image area 50 is allocated to the central upper portion interposed between the right side image area 48a and the left side image area 48b. On the front image area 50, the offset vehicle-width line 40b, together with the front wheel width trajectories 52a and 52b, is superimposed and displayed.

As described above, on a side image on which a predicted course may be largely displayed as compared to the traveling direction image in a case where the steering angle of the vehicle 1 equals to or larger than the predetermined value, the predicted course of the rear wheel at the turning direction side is displayed when the wheel is not idling, and is not displayed (alternatively, indicated by dashed lines, changed colors, or changed shadow lines) when the wheel is idling so that the occupant may easily recognize whether the rear wheel at the turning direction side is idling.

Figure 12:
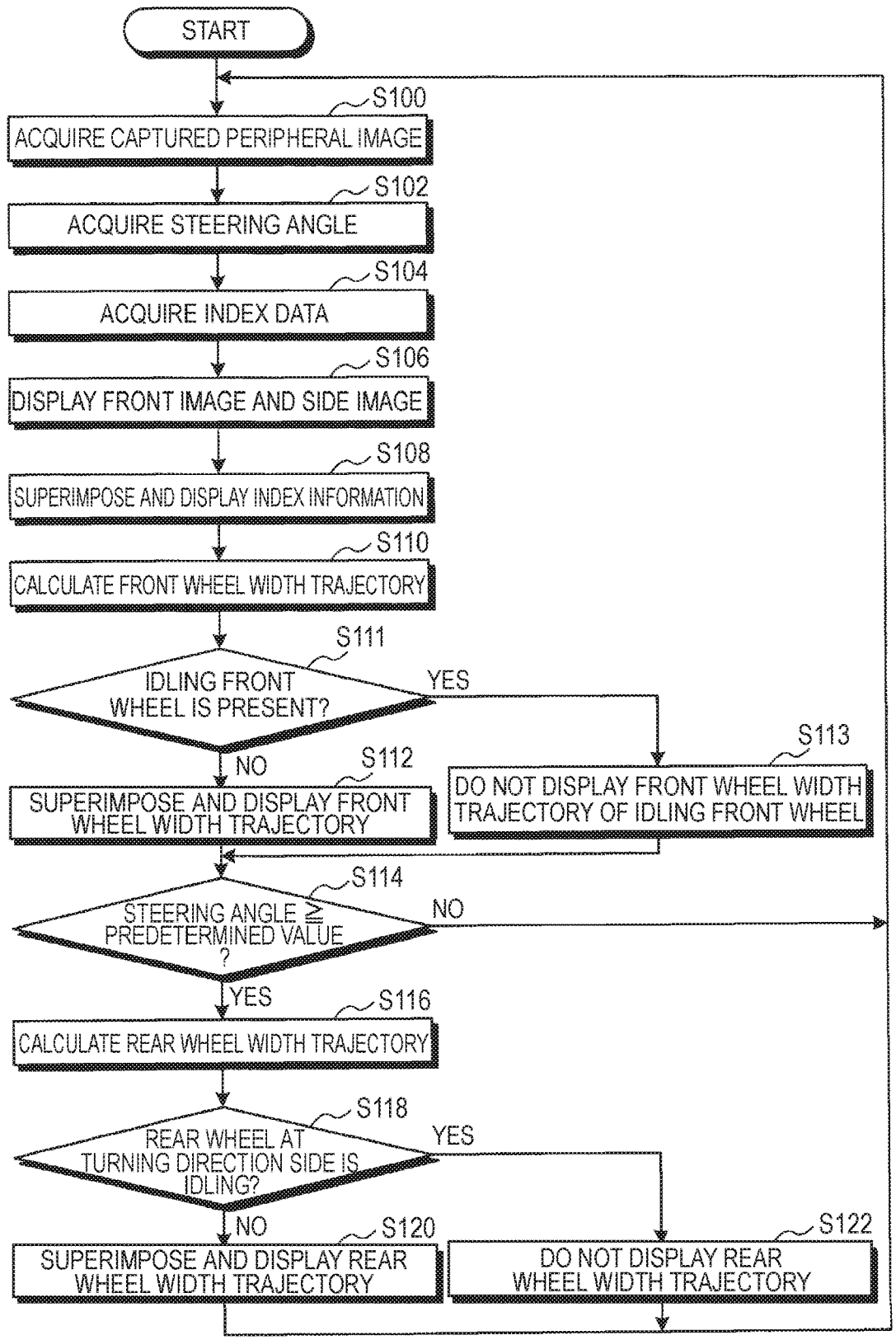
FIG. 12 is a flow chart illustrating the procedure of an imaging processing in the vehicle periphery monitoring device according to the embodiment.

An example of a procedure of an imaging processing in the periphery monitoring system 100 configured as described above will be described with reference to a flow chart of FIG. 12. FIG. 12 is a flow chart illustrating the procedure of the imaging processing in the vehicle periphery monitoring device according to the embodiment. The processing illustrated in the flow chart of FIG. 12 is repeatedly executed at a predetermined cycle when the front image area 50, the right side image area 48a, and the left side image area 48b are displayed. It is assumed that each imaging unit 16, the steering angle sensor 19, and the like continuously provide detected data to the ECU 14 at a predetermined control cycle.

First, when a display of the right side image area 48a, the left side image area 48b, the front image area 50, and the like on the display device 8 is requested, the peripheral image acquisition unit 27 of the ECU 14 acquires captured image data on surroundings of the vehicle 1 (S100). Thereafter, the steering angle acquisition unit 28 acquires a current steering angle based on data detected by the steering angle sensor 19 (S102). The index acquisition unit 32 reads an index to be displayed corresponding to the current steering angle from the SSD 14f and provides the index to the display controller 14d (S104).

Subsequently, the display controller 14d displays a front image on the front image area 50, a right side image on the right side image area 48a, and a left side image on the left side image area 48b (S106), and superimposes and displays index information on each display area (S108). The course calculator 30 calculates the front wheel width trajectories 52a and 52b based on the steering angle provided from the steering angle acquisition unit 28 (S110).

Subsequently, the idling determination unit 33 determines whether an idling front wheel is present (S111). When a determination of Yes is made, the process proceeds to S113, and when a determination of No is made, the process proceeds to S112. In S112, the display controller 14d superimposes and displays the calculated front wheel width trajectories 52a and 52b on the front image area 50. In S113, the display controller 14d places any of the calculated front wheel width trajectories 52a and 52b, which corresponds to the idling front wheel, in a non-display state in the front image area 50 (alternatively, indicated by dashed lines, changed colors, or changed shadow lines).

The course calculator 30 determines whether the steering angle provided from the steering angle acquisition unit 28 equals to or larger than a predetermined value (e.g.) 270° (S114). When a determination of Yes is made, the process proceeds to S116, and when a determination of No is made, the process returns to S100. In S116, the course calculator 30 calculates the rear wheel width trajectory 36 based on the steering angle. Then, the idling determination unit 33 determines whether the rear wheel at the turning direction side is idling (S118). When a determination of Yes is made, the process proceeds to S122, and when a determination of No is made, the process proceeds to S120.

In S120, the display controller 14d superimposes and displays the calculated rear wheel width trajectory 36 on a side image (an image at the turning direction side between an image at the right side image area 48a, and an image at the left side image area 48b). In S122, the display controller 14d places the calculated rear wheel width trajectory 36 in a non-display state on the side image (alternatively, indicated by dashed lines, changed colors, or changed shadow lines). After S120 and S122, the process returns to S100.

When the rear wheel width trajectory 36 is displayed to be superimposed through the processing in S120, the index information superimposed and displayed through the processing in S108 may be placed in a non-display state. In this manner, display contents required to be noticed by the user depending on situations may be displayed and highlighted so that the situations around the vehicle 1 may be more properly and easily recognized by the user.

In this manner, in the vehicle periphery monitoring device according to the embodiment, the display form of the predicted course of the wheel 3 on the peripheral image is changed according to the idling state of the wheel 3, and thus the occupant may easily grasp the current idling state of the wheel 3.

The predicted course is changed according to the steering angle. Thus, the driver may certainly grasp the grip point (a steering angle at which idling of the wheel may be resolved) by changing the steering angle through an operation of the handle (the steering unit 4) and seeing the change in the display form of the predicted course.

When the vehicle 1 includes a steering controller (the steering system 12) that automatically performs steering in a case where the wheel 3 is idling, etc., it is possible to save time for the driver to perform steering while searching for the grip point. Further, the steering controller that automatically performs steering may be activated when the driver operates, for example, an operation input unit such as a push button.

As both the front wheel and the rear wheel are steered, a range to search for a grip point is expanded. Further, the driver may see a change of the display form of the predicted course based on the steering angle according to the idling state for each of four wheels, and thus find out an optimum steering angle for escape from the stack of the vehicle 1.

When the wheel 3 is idling, the predicted course corresponding to the wheel 3 disappears from the peripheral image (alternatively, indicated by dashed lines, or changed colors) so that the occupant may easily specify the idling wheel 3.

In the vehicle 1, both the front wheel and the rear wheel may be steered through active rear steering (ARS). In this case, a range to search for a grip point is wide, and the possibility that the vehicle 1 escapes from the stack may be increased. When the right front wheel and the right rear wheel are controlled to pass through the same place, and the left front wheel and the left rear wheel are controlled to pass through the same place, the predicted courses of the right front wheel and the right rear wheel may be displayed as one course, and the predicted courses of the left front wheel and the left rear wheel may be displayed as one course.

As a method of escaping the vehicle 1 from a stack state, following methods may be exemplified. For example, a mechanism for automatically adjusting the pneumatic pressure of each wheel 3 may be provided to adjust the pneumatic pressure of each wheel 3 so as to obtain the grip of the idling wheel 3. For example, when the vehicle 1 is stacked on a rocky road, or the like, the height of any of the wheels 3 may be changed through automatic height control (AHC) and thus the balance of the vehicle 1 may be changed so as to obtain the grip of the idling wheel 3. For example, a jack or the like may be taken out from the back side of the floor surface of the vehicle 1 to tilt the vehicle 1 so that the wheel 3 is grounded.

For example, when the vehicle 1 is stacked on a sandy road, a liquid for solidifying sand may be taken out so as to secure the grip of the wheel 3. For example, when the vehicle 1 is stacked on a low friction road (low-ρ road), a liquid for increasing a friction between the wheel 3 and the road surface may be sprayed so as to obtain the grip of the idling wheel 3.

(Modification)

Figure 13:
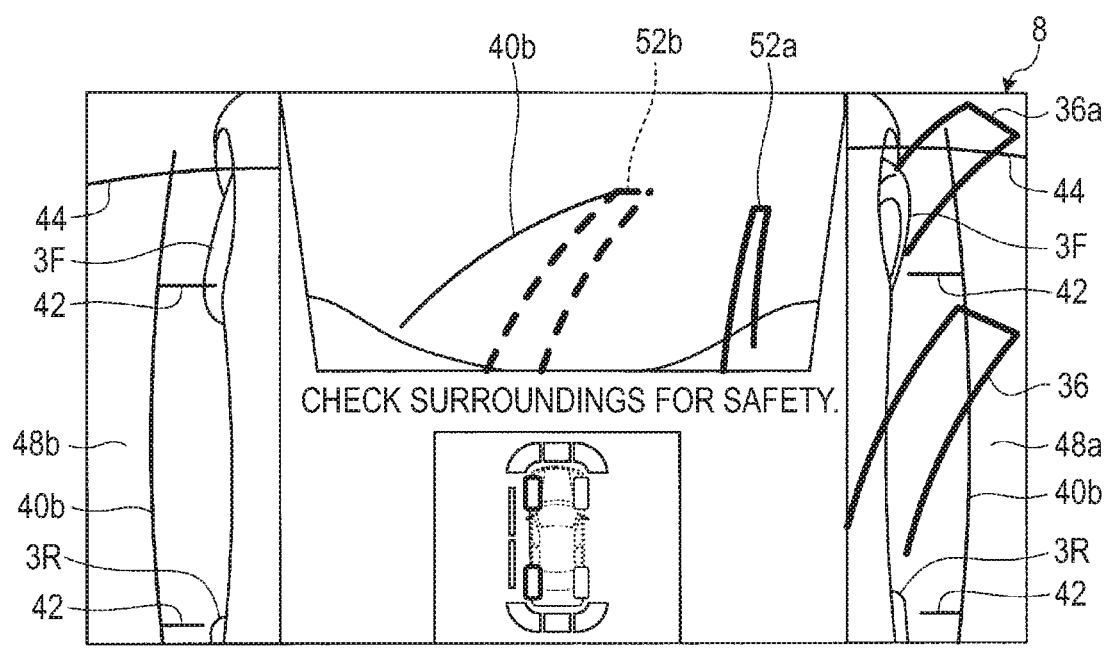
FIG. 13 is a view illustrating a display example in a modification of the vehicle periphery monitoring device according to the embodiment, in which predicted courses of non-idling right front and rear wheels are indicated by solid lines on a side image.

Hereinafter, a modification will be described. For example, in S120 of the above described flow chart of FIG. 12, when a front wheel at the turning direction side is not idling, the display controller 14d may superimpose and display the front wheel on the side image on which the rear wheel width trajectory 36 is superimposed and displayed. FIG. 13 is a view illustrating a display example in a modification of the vehicle periphery monitoring device according to the embodiment, in which predicted courses of non-idling right front and rear wheels are indicated by solid lines on a side image. Descriptions on the same points as those in FIG. 11 will be properly omitted.

In the display example of FIG. 13, in addition to the rear wheel width trajectory 36 extending from the rear wheel 3R, a front wheel width trajectory 36a extending from the front wheel 3F is superimposed and displayed in the right side image area 48a. The front wheel width trajectory 36a is a trajectory extending from the wheel, and thus may be easily recognized as a predicted course by the driver.

In this manner, on a side image on which a predicted course may be largely displayed as compared to the traveling direction image in a case where the steering angle of the vehicle 1 equals to or larger than the predetermined value, the predicted course of the front wheel at the turning direction side is displayed when the front wheel is not idling, and is not displayed (alternatively, indicated by dashed lines, changed colors, or changed shadow lines) when the front wheel is idling so that the occupant may easily recognize whether the front wheel at the turning direction side is idling.

Although embodiments and modifications disclosed here have been described, these embodiments and modifications are exemplary only, but are not intended to limit the scope of the disclosure. These novel embodiments may be implemented in other various forms, and various omissions, substitutions, and changes may be made without departing from the gist of the disclosure. These embodiments and modifications thereof are included in the scope or gist of the disclosure, and included in the disclosure described in claims and the equivalent scope thereof.

For example, the rear wheel width trajectory 36 may be displayed on a rear image when the vehicle 1 moves backward.

A vehicle periphery monitoring device according to an aspect of this disclosure includes, for example, a peripheral image acquisition unit that acquires a peripheral image output from an imaging unit that images a periphery of a vehicle; an idling determination unit that determines whether a wheel is idling based on a physical quantity of a wheel of the vehicle; and a display controller that displays the peripheral image on a display, and changes a display form of a predicted course of the wheel on the peripheral image according to an idling state of the wheel. According to this configuration, for example, the display form of the predicted course of the wheel on the peripheral image displayed on the display is changed according to the idling state of the wheel, and thus the occupant may easily grasp the current idling state of the wheel.

The vehicle periphery monitoring device may further include, for example, a steering angle acquisition unit that acquires a steering angle of the vehicle; and a course calculator that calculates the predicted course based on the steering angle. According to this configuration, for example, the predicted course is changed according to the steering angle. Thus, the driver may certainly grasp the grip point (a steering angle at which the idling of the wheel may be resolved) by changing the steering angle through the operation of a handle and seeing the change in the display form of the predicted course.

The vehicle may include, for example, a steering controller that automatically performs steering. According to this configuration, for example, automatic steering is performed at the time of idling of the wheel, which can save the driver's time and effort for performing steering while searching for the grip point.

The vehicle may be, for example, a four-wheeled vehicle, and both front wheels and rear wheels of the vehicle may be steered, and the display controller may change the display form of the predicted course based on the steering angle according to an idling state of each of the front wheels and the rear wheels. According to this configuration, for example, as both the front wheels and the rear wheels are steered, a range to search for a grip point is expanded. Further, the driver may see a change of the display form of the predicted course based on the steering angle according to the idling state for each of four wheels, and thus find out an optimum steering angle for escape from the stack of the vehicle.

The display controller may be configured, for example, to superimpose and display the predicted course corresponding to a non-idling wheel on the peripheral image, and not to superimpose and display the predicted course corresponding to an idling wheel on the peripheral image. According to this configuration, for example, when a wheel is idling, the predicted course corresponding to the wheel disappears from the peripheral image so that the occupant may easily specify the idling wheel.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle periphery monitoring device comprising:
at least one processor configured to:
   acquire a peripheral image output from at least one camera that images a periphery of a vehicle;
   determine, for each wheel of the vehicle, whether the wheel of the vehicle is idling or not based on a physical quantity of the wheel of the vehicle such that whether each wheel is idling or not is determined respectively;
   acquire a steering angle of the vehicle;
   calculate a predicted course based on the steering angle;
   display the peripheral image on a display;
   superimpose and display the predicted course of each wheel on the peripheral image; and
   change a display form of the predicted course of each wheel of the vehicle so as to, for each wheel of the vehicle, distinguish a grip point where the wheel of the vehicle is not idling from a point where the wheel of the vehicle is idling, wherein
   the physical quantity is a value based on a torque command.

2. The vehicle periphery monitoring device according to claim 1,
wherein the vehicle includes a steering controller that automatically performs steering.

3. The vehicle periphery monitoring device according to claim 1,
wherein the vehicle is a four-wheeled vehicle, and both front wheels and rear wheels of the vehicle are steered, and
the at least one processor changes the display form of the predicted course of each wheel based on the steering angle according to whether each of the front wheels and the rear wheels of the vehicle is idling or not.

4. The vehicle periphery monitoring device according to claim 1,
wherein the at least one processor is configured to, as a change of the display form, not display the predicted course corresponding to the each wheel determined to be idling on the peripheral image.

5. The vehicle periphery monitoring device according to claim 1,
wherein, as a change of the display form of each predicted course of the each wheel determined to be idling, the at least one processor superimposes and indicates by dashed lines of the predicted course, changes colors of the predicted course, or changes shadow lines of the predicted course on the peripheral image.

6. The vehicle periphery monitoring device according to claim 1,
wherein the at least one processor superimposes and displays the predicted course of each rear wheel of the vehicle when the steering angle is equal to or larger than a predetermined value.

7. The vehicle periphery monitoring device according to claim 1,
wherein the at least one processor is configured to determine, for each wheel of the vehicle, whether the wheel of the vehicle is idling or not based on a deviation between a target value and an actual value in relation to the physical quantity.

* * * * *